ated May 18, 1965

3,184,413
POLYMERIC LUBRICATING OIL ADDITIVES CONTAINING IODINE AND USES THEREOF
Michael J. Furey, Berkeley Heights, and Philip Zaybekian, Elizabeth, N.J., assignors to Esso Research and Engineering Company, a corporation of Delaware
No Drawing. Filed June 21, 1962, Ser. No. 204,043
2 Claims. (Cl. 252—56)

This invention relates to lubricant additives. More specifically, this invention relates to polymeric lubricant additives containing iodine.

It is conventional to add polymers to lubricating oil, especially in formulating crankcase motor oils, for one or more of the following purposes: to increase the viscosity index of the oil; to lower the pour point of the oil; to thicken the oil; to impart detergency; or to improve the sludge-handling capacity of the oil. It has now been discovered that conventional polymeric lubricating oil additives can be treated with iodine to impart improved antifriction, extreme pressure (EP), and antiwear properties to them. Lubricant additives containing iodine and prepared according to the present invention will find utility wherever lubricant additives having antifriction, antiwear, and EP properties are desired, e.g., automobile crankcase lubrication, bearing lubrication, gear lubrication, etc.

PREPARATION

The treatment with iodine may be made by contacting a conventional polymeric additive (either alone or in solution) with solid iodine, e.g., iodine crystals, or by dissolving iodine in a solvent to form a solution and treating the polymeric additive with said solution, or by bubbling iodine vapor through the polymeric additive. The temperature of treatment will usually be from 20° to 200° F., preferably 40° to 100° F., e.g., 60° F. The treatment will generally last from 0.1 to 100 hours or more, usually from 1 to 72 hours, preferably from 2 to 48 hours, e.g., 24 hours. The length of treatment will depend upon the quantities of reagents employed, temperature, degree of agitation, etc. The pressure will usually be atmospheric, although sub- and super-atmospheric pressures may be used.

When a polymeric additive is treated with solid iodine, the iodine and polymeric additive are merely mixed together under the conditions just recited. If desired, the iodine can be pulverized or powdered to facilitate the treatment. The relative quantities of iodine and polymeric additive used will be determined by such factors as the amount of iodine desired in the final product, desired rate of treatment, etc.

If it is desired to dissolve the iodine in a solvent to form a solution prior to treating a polymeric additive, such dissolution will generally be done at temperatures of from 20° to 200° F., usually from 40° to 100° F., e.g., 80° F. Generally the iodine will dissolve to the extent of from 0.1 to 100 grams of iodine per 100 ml. of solvent and more usually from 1 to 50 grams of iodine per 100 ml. of solvent. Suitable solvents include, in general, any solvent which will not react with the polymer or iodine, i.e., an inert solvent, which is preferably a solvent for both the iodine and the polymer, and which can readily be removed from the polymer after the treatment is complete. These solvents can generally be characterized as having a specific gravity of from 0.5 to 1.8 and a boiling point of from 30 to 250° F. Suitable solvents include ethyl alcohol, benzene, carbon disulfide, cyclohexane, chloroform, diethyl ether, glycerol, carbon tetrachloride, and oils, as well as solvents containing nitrogen atoms, e.g., pyridine, quinoline or the amines. Of these, diethyl ether is preferred. The iodine-containing solution is then mixed with the polymeric additive and the treatment is conducted under the conditions previously outlined. The resulting iodine-containing polymeric additive may then be purified by normal techniques such as filtration, evaporation, crystallization, etc. to remove the solvent and any unreacted iodine.

Alternatively, if iodine vapor is to be employed, it will usually be bubbled through the polymeric additive, although other techniques may be used, e.g., spraying the polymer through iodine vapor. The previously outlined conditions of temperature, pressure and time of treatment also apply when iodine vapor is used. When iodine vapor is bubbled through a polymeric additive, nitrogen or some other inert gas may be used to carry the unreacted iodine vapors away.

Polymeric additives containing from 10 to 90 wt. percent iodine, based on the total weight of iodine and polymer, generally provide the most beneficial results although lower iodine concentrations may be used, e.g., 0.5 wt. percent. Preferably the amount of iodine will be from 20 to 80 wt. percent, and most preferably from 40 to 80 wt. percent, of the iodine-containing polymer. These iodine-containing polymeric additives may, in turn, be incorporated into lubricating oil compositions to give a total iodine concentration of from 0.005 to 3.0 wt. percent, preferably 0.01 to 0.8 wt. percent. Alternatively, these additives may be added to oil concentrates in which case the iodine content will be proportionately higher.

POLYMERIC ADDITIVES WHICH CAN BE TREATED WITH IODINE

The polymeric lubricant additives, which can be improved by the addition of iodine thereto, may be homopolymers, that is, polymers consisting of a single constituent monomer, or they may be copolymers consisting of two or more constituent monomers. These polymers may be prepared by conventional polymerization or copolymerization techniques well known in the art. The preparation of such polymeric materials does not constitute a part of this invention.

The polymers useful in the present invention include oil soluble homopolymers and copolymers formed from $C_2$ to $C_{30}$ olefins and $C_4$ to $C_{30}$ ethylenically mono-unsaturated esters. The molecular weight (Staudinger) of these polymers will usually fall within the range of 300 to 500,000, e.g., 500 to 60,000.

The homopolymers are exemplified by the following:

Polymers of monoolefins which may be aliphatic or have an aromatic substituent, e.g., ethylene, propylene, isobutylene, alkyl styrene, etc.

Polymers of diolefins, e.g., butadiene, isoprene, etc.

Polymers of esters of acrylic and of methacrylic acids, e.g., decyl acrylate, lauryl methacrylate, mixed $C_8$ to $C_{18}$ methacrylates, etc.

Polymers of vinyl esters, e.g., vinyl 2-ethylhexoate, the vinyl ester of coconut acids, the vinyl ester of $C_{10}$ Oxo acids made by the oxonation of tripropylene, etc.

Polymers of vinyl ethers, e.g., vinyl isobutyl ether, vinyl decyl ether, the vinyl ether of $C_8$ Oxo alcohol made by the oxonation of $C_7$ monoolefin (propylene-butylene copolymer), etc.

Polymers of esters of α,β-unsaturated dicarboxylic acids, e.g., octyl fumarate, lauryl maleate, the aconitate and itaconate esters of mixed alcohols obtained by the hydrogenation of coconut oil acids, etc.

The copolymers are exemplified by the following:

Copolymers of various olefins, e.g., ethylene and propylene; isobutylene and styrene; butadiene and isobutylene; butadiene and methyl styrene; etc.

Copolymers of olefins and unsaturated esters, e.g., isobutylene and ethyl fumarate; octadecene and lauryl maleate; styrene and tetradecyl fumarate; etc.

Copolymers of various esters of unsaturated acids, e.g., ethyl methacrylate and octyl fumarate; methyl acrylate and dodecyl maleate; octadecyl fumarate and octyl aconitate; methyl methacrylate and stearyl itaconate; isopropenyl acetate and tetradecylacrylate, etc.

Copolymers of vinyl esters and unsaturated acid esters, e.g., vinyl acetate and fumarate esters of tallow alcohols; vinyl 2-ethyl butyrate and isodecyl maleate; isopropenyl acetate and the itaconic esters of coconut alcohols; etc.

Copolymers of three or more monomers, e.g., the terpolymer of vinyl acetate, octyl fumarate and maleic anhydride, etc.

The preferred polymeric additives for use according to the present invention include polybutene and its derivatives, e.g., phosphosulfurized polybutene, and ethoxylated, hydrolyzed, phosphosulfurized polybutene. The polybutene will generally have a molecular weight (Staudinger) of from 300 to 25,000, preferably 400 to 10,000, e.g., 800.

As previously indicated, polymeric additives, typified by the above, are useful in lubricating compositions to improve the viscosity index, for thickening, as pour-point depressants, for detergency, etc. Generally, the homopolymers have one desirable property (in addition to the thickening characteristic), the copolymers have two desirable properties, and the terpolymers have three desirable properties.

EXAMPLES

The present invention will be further understood by reference to the following examples which include a preferred embodiment of this invention.

*Example 1*

One hundred grams of iodine crystals, 100 grams of polybutene having a Staudinger molecular weight of about 780 and 200 grams of diethyl ether as a solvent were mixed together to form a solution which was then allowed to stand at room temperature, i.e., about 75° F. for 24 hours. Next, the solution was filtered through filter paper to remove any excess iodine crystals. The filtrate was placed on a steam bath (about 160° F.) for about 3 hours to evaporate the ether. The final product (a dark viscous liquid) contained about 76 wt. percent iodine.

*Example 2*

A mixture of 100 grams of iodine and 200 grams of diethyl ether as a solvent was mixed with 100 grams of a phosphosulfurized polybutene prepared from polybutene having a Staudinger molecular weight of about 780. This mixture was maintained at a temperature of about 70° F. for 24 hours. The final product was isolated using the technique described in Example 1. The product contained about 34 wt. percent iodine. The phosphosulfurized polybutene used above was a commercially available material having a phosphorous content within the range of 3–4 wt. percent and a sulfur content within the range of 6–7 wt. percent. This phosphosulfurized polybutene is oil-soluble, i.e., 2 wt. percent of the phosphosulfurized material is completely soluble in hexane at 70° F.

*Example 3*

One hundred grams of iodine crystals, 100 grams of an ethoxylated, hydrolyzed, phosphosulfurized polybutene prepared from a polybutene having a Staudinger molecular weight of about 780, and 200 grams of diethyl ether as a solvent were mixed together and allowed to stand at room temperature, i.e., 75° F., for 24 hours. Product recovery was similar to that employed in Example 1. The product contained about 25 wt. percent iodine.

The ethoxylated, hydrolyzed, phosphosulfurized polybutene was prepared by first diluting a phosphosulfurized polybutene, such as that described in Example 2, with a mineral oil (such as a paraffinic distillate having a viscosity of 112 SUS at 100° F. and a viscosity index of 113) to a 50% concentration. The dilute mixture was then hydrolyzed at about 320° F. with steam. The hydrolyzing reaction was controlled by observing the increase in acid number (units are mg. of KOH/gm. of sample as determined by Method ASTM–D–974) which went from an initial value of about 8 to a value of about 50 upon completion of the hydrolysis. The hydrolyzed product was then treated with ethylene oxide at about 320° F. to reduce the acid number from about 50 to less than 1. The amount of ethylene oxide required for this step was roughly equal to 16% by weight, based on the amount of the phosphosulfurized polybutene employed.

Lubricating oil compositions were made by dissolving the iodine-treated polymers of Examples 1–3 in a paraffinic lubricating oil having a viscosity of 112 SUS at 100° F. and a viscosity index of 113. For comparison, other lubricating compositions were made by dissolving 1.0 wt. percent of the untreated polymeric additives in the same mineral oil. These various compositions, together with the base oil, per se, were tested for their load carrying ability in a 4-ball EP test and in the ball and cylinder apparatus which is hereinafter described. The results of those tests are shown in Table I, infra.

The ball and cylinder apparatus employed was a rotating cylinder apparatus designed to measure the extent of metallic contact and friction between sliding lubricated surfaces. A complete description of the apparatus can be found in a paper entitled "Metallic Contact and Friction Between Sliding Surfaces" by M. J. Furey, presented at the 1960 Joint ASLE-ASME Lubrication Conference, October 19, 1960, in Boston, Massachusetts. This paper has been published by the American Society of Lubrication Engineers, 5 North Wabash Avenue, Chicago 2, Illinois, under the above-noted title in the ASLE Transactions, vol. 4, No. 1, pages 1–11, April 1961.

Basically the apparatus consists of a fixed metal ball (½ inch dia.) loaded against a rotating steel cylinder (1¾ inch dia.). The extent of metallic contact is determined by passing an electric current through the ball and cylinder and measuring both the continuous and the average electric resistance between the contacting surfaces of the ball and cylinder. The extent of metallic contact is expressed as the percent of the time that metallic contact occurs in a given period of time and is a measure of wear, i.e., the less the contact, the less the wear. Friction between the ball and the cylinder can be recorded simultaneously with metallic contact and is expressed in terms of grams of force.

Referring now to Table I, the addition of the iodine-treated polybutene of Example 1 to the base oil resulted in a lubricating composition having highly improved EP properties, as well as markedly reducing both metallic contact and friction.

The addition of the iodine-treated phosphosulfurized polybutene of Example 2 to the base oil resulted in highly improved EP characteristics and markedly reduced the friction.

The addition of the iodine-treated ethoxylated, hydrolyzed, phosphosulfurized polybutene of Example 3 to the base oil resulted in highly improved EP characteristics. It also served to reduce friction—particularly at the high load (960 gms.).

TABLE I

| | 4-ball EP test [1] (kg.) | | Ball on cylinder test (240 r.p.m. for 32 min.) | | |
|---|---|---|---|---|---|
| | Seize | Weld | Load (gms.) | Percent metallic contact | Friction (gms.) |
| Base oil: a paraffinic lubricating oil having a viscosity of 112 SUS at 100° F. and a VI of 113 | 63 | 100 | 240<br>960<br>4,000 | 92<br>97<br>99 | 23<br>102<br>329 |
| Base oil plus 1% of the untreated polybutene of Example 1 | 40 | 89 | 240<br>960<br>4,000 | 92<br>100<br>100 | 28<br>103<br>375 |
| Base oil plus 1% of the iodine-treated polybutene of Example 1 | (2) | (2) | 240<br>960<br>4,000 | 1<br>2<br>7 | 12<br>34<br>184 |
| Base oil plus 1% of the untreated phosphosulfurized polybutene of Example 2 | 50 | 112 | 240<br>960<br>4,000 | 100<br>100<br>100 | 27<br>102<br>382 |
| Base oil plus 1% of the iodine-treated phosphosulfurized polybutene of Example 2 | 200 | 316 | 240<br>960<br>4,000 | 96<br>100<br>100 | 11<br>28<br>172 |
| Base oil plus 1% of the untreated ethoxylated, hydrolyzed, phosphosulfurized polybutene of Example 3 | 56 | 100 | 240<br>960 | 89<br>100 | 29<br>97 |
| Base oil plus 1% of the iodine-treated ethoxylated, hydrolyzed, phosphosulfurized polybutene of Example 3 | 224 | 280 | 240<br>960 | 85<br>99 | 21<br>31 |

[1] Steel-on-steel at 1800 r.p.m.  [2] No seize, no weld at 580 kg.

*Example 4*

A series of samples designated A to J was prepared by the following procedure to illustrate the effect of the iodine/polybutene ratio as well as the inert solvent/polybutene ratio on the ultimate iodine content of the polymer. The procedure employed was as follows:

a. The iodine crystals, polybutene and diethyl ether were weighed into separate flasks;
b. These materials were mixed together in one of the flasks by manually shaking the flask;
c. The mixture was allowed to stand for about 24 hours at room temperature (about 75° F.);
d. The mixture was next filtered through filter paper to remove any excess iodine;
e. The diethyl ether was evaporated from the filtrate by placing the filtrate on a steam bath (160° F.) for 48 hours.

The quantities used and analyses of the samples are shown below in Table II.

TABLE II

| Sample | Gms. $I_2$ | Gms. polybutene [1] | Gms. diethyl ether | Weight percent iodine in final product |
|---|---|---|---|---|
| A | 0 | 100 | 100 | 0 |
| B | 5 | 95 | 100 | 0.58 |
| C | 10 | 90 | 100 | 0.81 |
| D | 25 | 75 | 100 | 7.48 |
| E | 50 | 50 | 100 | 23.0 |
| F | 75 | 25 | 100 | 44.3 |
| G | 90 | 10 | 100 | 59.0 |
| H | 100 | 0 | 100 | (2) |
| I | 10 | 90 | 0 | 0.69 |
| J | 25 | 75 | 0 | 0.80 |

[1] Approximate molecular weight (Staudinger)—780.
[2] No product (no $I_2$/ether complex noted).

It is apparent from Table II that the amount of iodine in the final product is increased when the initial ratio of iodine to polybutene is increased. Also, the addition of the solvent appears to increase the amount of iodine incorporated into the polymer. Compare specifically Sample J with Sample D.

One weight percent of Samples D, E, F and G were added to the same base oil shown in Table I, supra, and were tested in the same ball and cylinder apparatus. Samples E, F, and G were also given a 4-ball EP test. Those test results are summarized in Table III.

TABLE III

| Sample | 4-ball EP test [1] (kg.) | | Ball on cylinder test (240 r.p.m. for 32 min.) | | | |
|---|---|---|---|---|---|---|
| | | | Percent metallic contact at load of— | | Friction (grams) at load of— | |
| | Seize | Weld | 240 gms. | 960 gms. | 240 gms. | 960 gms. |
| Base oil per se | 63 | 100 | 91 | 99 | 25 | 102 |
| Base oil plus 1 weight percent D | | | 46 | 100 | 15 | 71 |
| Base oil plus 1 weight percent E | 70 | 126 | 10 | 0 | 9 | 28 |
| Base oil plus 1 weight percent F | None at 420 | 420-520 | 0 | 90 | 12 | 37 |
| Base oil plus 1 weight percent G | 620 | 700 | 4 | 78 | 14 | 40 |

[1] Steel-on-steel at 1800 r.p.m.

Table III clearly illustrates the benefits to be obtained from using the iodine-treated polymers of the present invention in terms of reducing the percent metallic contact (i.e., wear) and friction, as well as improving the EP properties.

*Example 5*

Eight hundred fifty grams of cyclohexane as an inert solvent and 200 grams of a copolymer of equi-molar proportions of butadiene and methylstyrene having a Staudinger molecular weight of about 3,000 are mixed together. Gaseous iodine is bubbled through the mixture until 30 wt. percent of iodine is incorporated in the polymer. The product is then heated to evaporate the cyclohexane to thereby leave the iodine-containing copolymer product. Two weight percent of the iodine-containing polymer is then added to the base oil of Table I to form a lubricant having improved EP and antiwear properties.

*Example 6*

One hundred grams of iodine crystals, 100 grams of the terpolymer of alkyl fumarate, vinyl acetate and maleic anhydride (a lubricating oil polymer marketed by the Enjay Chemical Co., 15 West 51st Street, New York 19, New York, under the trade name "Paratone 430") and 200 grams of carbon tetrachloride as an inert solvent are mixed together and allowed to stand at room temperature (72° F.) for about 72 hours. Product recovery is similar to that of Example 1. The product will contain an amount of iodine within the range contemplated by this invention. When the iodine-containing polymer is added to a synthetic lubricating oil [bis(2-ethylhexyl) sebacate] in an amount sufficient to provide a total iodine content of about 0.5 wt. percent, the lubricating composition thus formed will have improved EP and antifriction properties.

Thus, it is apparent that the addition of iodine to polymeric lubricant additives results in lubricating compositions which are extremely effective in reducing friction and have greatly improved EP properties. The addition of iodine according to the present invention does not appreciably affect the original properties of the polymers, e.g., VI improvement, etc. The net effect is to impart additional properties to the polymeric additives.

It should be realized that other agents can also be used in the ultimate lubricating compositions. Additionally, other materials may be combined with these polymeric iodine-containing additives to produce additive mixtures having other properties. Examples of these other agents include dyes, pour depressants, heat thickened fatty oils, sulfurized fatty oils, organo-metallic compounds, thickeners, viscosity index improvers, resins, rubber, other polymers, colloidal solids, soaps, sludge dispersants and anti-oxidants. Numerous other agents will be obvious to those skilled in the art.

While the above invention has been described with a certain degree of particularity, it is realized that various additional modifications and adaptations can be made within the spirit and scope of the invention as hereinafter claimed.

What is claimed is:
1. A lubricating composition comprising a major amount of lubricating oil and an iodinated copolymer of 300 to 500,000 molecular weight containing 10 to 90 wt. percent iodine in an amount of said copolymer sufficient to give an iodine concentration in said composition of 0.005 to 3.0 wt. percent iodine, said iodinated copolymer being formed by mixing iodine with a copolymer of alkyl fumarate ester and ester of vinyl alcohol and low molecular weight saturated fatty acid, said esters containing 4 to 30 carbon atoms and said copolymer being a lubricating oil additive.

2. A composition according to claim 1, wherein said iodinated polymer contains 40 to 80 wt. percent iodine, wherein said iodine concentration is .01 to .8 wt. percent, and wherein said copolymer is a copolymer of alkyl fumarate, vinyl acetate and maleic anhydride.

References Cited by the Examiner
UNITED STATES PATENTS

| | | | |
|---|---|---|---|
| 2,126,590 | 8/38 | Valentine | 252—58 |
| 2,155,204 | 4/38 | Prutton | 252—58 |
| 2,225,318 | 12/40 | Morway et al. | 252—58 X |
| 2,298,833 | 10/42 | Muessig | 252—58 |
| 2,308,622 | 1/43 | Lincoln et al. | 252—58 |
| 2,920,064 | 1/60 | Baptist et al. | 260—88.2 |
| 2,927,895 | 3/60 | Neunherz | 252—58 |
| 2,992,988 | 7/61 | Dipner | 252—58 |
| 3,062,795 | 11/62 | Cain et al. | 260—88.2 |

FOREIGN PATENTS 807,737   1/59   Great Britain.

DANIEL E. WYMAN, *Primary Examiner.*
JULIUS GREENWALD, *Examiner.*